US006940020B2

(12) United States Patent
Ide et al.

(10) Patent No.: US 6,940,020 B2
(45) Date of Patent: Sep. 6, 2005

(54) SHIELDED STRUCTURE OF FLAT SHIELDING ELECTRIC WIRE

(75) Inventors: Tetsuro Ide, Haibara-gun (JP); Akira Mita, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 65 days.

(21) Appl. No.: 10/128,430

(22) Filed: Apr. 24, 2002

(65) Prior Publication Data

US 2003/0094295 A1 May 22, 2003

(30) Foreign Application Priority Data

Apr. 25, 2001 (JP) .................................... P2001-128025

(51) Int. Cl.[7] ............................................... H02G 15/06

(52) U.S. Cl. ...................................... 174/78; 174/88 R

(58) Field of Search ................................ 174/78, 84 R, 174/117 F, 75 C, 88 R, 92, 138 F; 439/98, 99

(56) References Cited

U.S. PATENT DOCUMENTS 2,132,235 A * 10/1938 Green .................... 174/119 C
4,568,797 A * 2/1986 Binder et al. ............ 174/128.1
6,046,407 A * 4/2000 Ide .............................. 174/78
6,072,123 A * 6/2000 Ide et al. ...................... 174/78
6,087,589 A * 7/2000 Ide ............................. 174/78

FOREIGN PATENT DOCUMENTS

DE 199 09 320 A1 3/1999
FR 2.180.630 11/1973
GB 2 350 732 A 12/2000
JP 7-37437 * 2/1995
JP 2000-21249 * 1/2000

* cited by examiner

*Primary Examiner*—Chau N. Nguyen
(74) *Attorney, Agent, or Firm*—Sughrue Mion, PLLC

(57) ABSTRACT

In a shielded structure of a flat shielding electric wire, the flat shielding electric wire includes a plurality of shielding cores, an inner insulating sheathe covering each of the plurality of shielding cores, a conductive covering member covering the inner insulating sheathes, and a first outer insulating sheathe covering the conductive covering member. A pair of resin members sandwiches the flat shielding electric wire therebetween. A coating electric wire is provided between the flat shielding electric wire and one of the pair of resin members. The coating electric wire includes a conductive wire and a second outer insulating sheathe covering the conductive wire. The first outer insulating sheathe and the second outer insulating sheathe are fused by ultrasonic excitation so that the conductive wire is electrically connected to a part of the conductive covering member. At least one of the pair of resin members is formed with an ultrasonic attenuation groove so as to face at least a part of the second outer insulating sheathe.

9 Claims, 6 Drawing Sheets

SHIELDED STRUCTURE OF FLAT SHIELDING ELECTRIC WIRE

BACKGROUND OF THE INVENTION

The present invention relates to a shielded structure of a flat shielding electric wire for connecting a shield covering member of the flat shielding electric wire to a grounding conductor, and to a method of manufacturing the flat shielding electric wire.

The applicant proposed a related shielded structure of a flat shielding electric wire in which a shield covering member of the flat shielding electric wire sandwiched by a pair of resin members is electrically connected to a conductive wire of a grounding conductor by an ultrasonic horn. The related shielded structure will be described bellow.

As shown in FIG. 7, a flat shielding electric wire 100 is constituted by two shielding cores 103 having cores 101 covered with insulating inner casings 102 respectively and arranged in parallel, a shield covering member 104 of an electric conductor for covering the outer periphery of the two shielding cores 103 and having a contact portion 104*a* for a grounding conductor on the outside in the direction of the arrangement of the two shielding cores 103, a drain wire 105 provided in the contact portion 104*a* for the grounding conductor, and an insulating outer casing 106 for further covering the outer periphery of the shield covering member 104.

A pair of resin members 110 and 111 is provided with concave portions 110*b* and 111*b* almost corresponding to the outer sectional shapes of the shielding core 103 and the drain wire 105 in the flat shielding electric wire 100 with mutual bonding faces 110*a* and 111*a* butted against each other, respectively. Moreover, the mutual bonding faces 110*a* and 111*a* of the resin members 110 and 111 have flat faces 110*c* and 111*c* corresponding to a point to be set the contact portion 104*a* for a grounding conductor of the flat shielding electric wire 100 and a grounding conductor 113 for pressing the contact portion 104*a* for the grounding conductor and the grounding conductor 113 with the mutual bonding faces 110*a* and 111*a* butted against each other.

An ultrasonic horn 115 is constituted by a lower support base 115*a* and an ultrasonic horn body 115*b* provided just thereabove.

Next, a shielding procedure will be described. The lower resin member 111 is provided on the lower support base 115*a* of the ultrasonic horn 115. The flat shielding electric wire 100 is mounted on the lower resin member 111. One end side of the grounding conductor 113 is mounted thereon, and furthermore, the upper resin member 110 is put from thereabove. Thus, the flat shielding electric wire 100 is provided in each of the concave portions 110*b* and 111*b* of the resin members 110 and 111. The end side of the grounding conductor 113 is provided between the flat shielding electric wire 100 and the upper resin member 110, thereby bringing an ultrasonic excitation application set state.

In the ultrasonic excitation application set state, compression force is applied between the resin members 110 and 111, and a vibration is simultaneously applied by the ultrasonic horn 115. Consequently, the insulating outer casing 106 of the flat shielding electric wire 100 and an insulating outer casing 113*b* of the grounding conductor 113 are fused and scattered by the heat generation of a vibration energy so that a conductive wire 113*a* of the grounding conductor 113 comes in electrical contact with the contact portion 104*a* for the grounding conductor of the shield covering member 104 and the drain wire 105 in the flat shielding electric wire 100. Moreover, each of the contact portions of the bonding faces 110*a* and 111*a* of the resin members 110 and 111, the contact portion of the internal peripheral faces of the concave portions 110*b* and 111*b* of the resin members 110 and 111 and the insulating outer casing 106 of the flat shielding electric wire 100, and the contact portion of the insulating resin 113*b* of the grounding conductor 113 and the resin members 110 and 111 are fused by the heat generation of the vibration energy and the fused portions are solidified after the ultrasonic vibration is completely applied. Consequently, the resin members 110 and 111, the flat shielding electric wire 100 and the grounding conductor 113 are fixed to each other.

According to the related shielded structure, it is not necessary to peel the insulating outer casings 106 and 113*b* of the flat shielding electric wire 100 and the grounding conductor 113, and it is preferable that the lower resin member 111, the flat shielding electric wire 100, the grounding conductor 113 and the upper resin member 110 should be assembled in this order to give the ultrasonic vibration. Consequently, the number of steps for shielding is decreased, and a complicated manual work is not required and automation can also be achieved.

In the related shielded structure, however, when an ultrasonic wave is applied in the ultrasonic vibration application set state in which the flat shielding electric wire 100 and the grounding conductor 113 are set between the resin members 110 and 111, a phenomenon in which the grounding conductor 113 is moved in such a direction as to be repelled out of the resin members 110 and 111 by the ultrasonic vibration (a direction of an arrow a in FIG. 7) is generated (a cleaning effect). For this reason, a sufficient contact cannot be obtained between the grounding conductor 113, the contact portion 104*a* for the grounding conductor of the shield covering member 104 and drain wire 105 so that an electric connection performance is deteriorated.

SUMMARY OF THE INVENTION

It is therefore an object of the present invention to provide a shielded structure of a flat shielding electric wire and a method of manufacturing the flat shielding electric wire in which a sufficient contact can be obtained between a grounding conductor and a contact portion for the grounding conductor of a shield covering member so that the reliability of an electric connection performance can be enhanced.

In order to achieve the above object, according to the present invention, there is provided a shielded structure of a flat shielding electric wire comprising:

a flat shielding electric wire including:

a plurality of shielding cores;

an inner insulating sheathe, covering each of the plurality of shielding cores;

a conductive covering member, covering the inner insulating sheathes; and a first outer insulating sheathe, covering the conductive covering member;

a pair of resin members, sandwiching the flat shielding electric wire therebetween; and a coating electric wire, which is provided between the flat shielding electric wire and one of the pair of resin members, including:

a conductive wire; and a second outer insulating sheathe, covering the conductive wire, wherein the first outer insulating sheathe and the second outer insulating sheathe are fused by ultrasonic excitation so that the conductive wire is electrically connected to a part of the conductive covering member; and wherein at least one of the pair of resin members is formed with an ultrasonic attenuation groove so as to face at least a part of the second outer insulating sheathe.

Preferably, the ultrasonic attenuation groove faces a tip end portion of the second outer insulating sheathe.

In the configurations, the transmitted ultrasonic wave is reduced by the ultrasonic attenuation groove so that a cleaning effect caused by the ultrasonic excitation can be reduced and the second outer insulating sheathe is rarely moved from the preset position between the flat shielding electric wire and one of the pair of resin members. Accordingly, a sufficient contact can be obtained between the conductive wire and the part of the conductive covering member so that the reliability of an electric connection performance can be enhanced.

Preferably, The shielded structure further comprises a drain wire covered with a part of the conductive covering member.

In the configuration, the conductive wire also is electrically connected to the drain wire so that the shielding effect can be enhanced.

Preferably, a depth of the ultrasonic attenuation groove is a half of an outer diameter of the second outer insulating sheathe.

In the configuration, in addition to the reduction of propagation of the ultrasonic excitation by the ultrasonic attenuation groove, a portion of the second outer insulating sheathe accommodated in the ultrasonic attenuation groove of the resin member is slightly pressed by a bottom face of the ultrasonic attenuation groove so that the second outer insulating sheathe is not fluttered by the ultrasonic excitation. Consequently, the second outer insulating sheathe can be ultrasonic welded reliably in a desirable set position between the pair of resin members.

Preferably, each bonding faces of the pair of resin members is formed with a first region fitting with an outer shape of the flat shielding electric wire and a second region having a flat face to press the conductive wire and the conductive covering member.

In the configuration, the conductive wire and the conductive covering member are compressed by the flat face of the pair of resin members so that the conductive wire is expanded by the compression force. The conductive wire is contacted with the conductive covering member in the expansion state. Consequently, broad contact portions of the conductive wire and the conductive covering member can be obtained so that the reliability of the electric connection properties can be enhanced.

Preferably, the conductive wire is a plated wire having a lower melting point than a temperature attained by the ultrasonic excitation.

In the configuration, the conductive wire made of low-melting metal is partially fused by the excitation energy so that the conductive wire is brought into contact with the conductive covering member. Therefore, a reliability in the contact portion of the conductive covering member and the conductive wire can be enhanced.

According to the present invention, there is also provided a method of manufacturing a flat shielding electric wire, comprising the steps of:

providing a flat shielding electric wire, which includes a plurality of shielding cores, an inner insulating sheathe covering each of the plurality of shielding cores, a conductive covering member covering the inner insulating sheathes, and a first outer insulating sheathe covering the conductive covering member;

providing a coating electric wire, which includes a conductive wire and a second outer insulating sheathe covering the conductive wire;

providing a pair of resin members, having bonding faces, at least one bonding face formed with an ultrasonic attenuation groove;

sandwiching the flat shielding electric wire and the coating electric wire by the pair of resin members so that the ultrasonic attenuation groove faces at least a part of the second outer insulating sheathe; and applying an ultrasonic wave to the first outer insulating sheathe and the second outer insulating sheathe such that the first outer insulating sheathe and the second outer insulating sheathe are fused by ultrasonic excitation so that the conductive wire is electrically connected to a part of the conductive covering member.

In the method, the transmitted ultrasonic wave is reduced by the ultrasonic attenuation groove so that a cleaning effect caused by the ultrasonic excitation can be reduced and the second outer insulating sheathe is rarely moved from the preset position between the flat shielding electric wire and one of the pair of resin members. Accordingly, a sufficient contact can be obtained between the conductive wire and the part of the conductive covering member so that the reliability of an electric connection performance can be enhanced.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
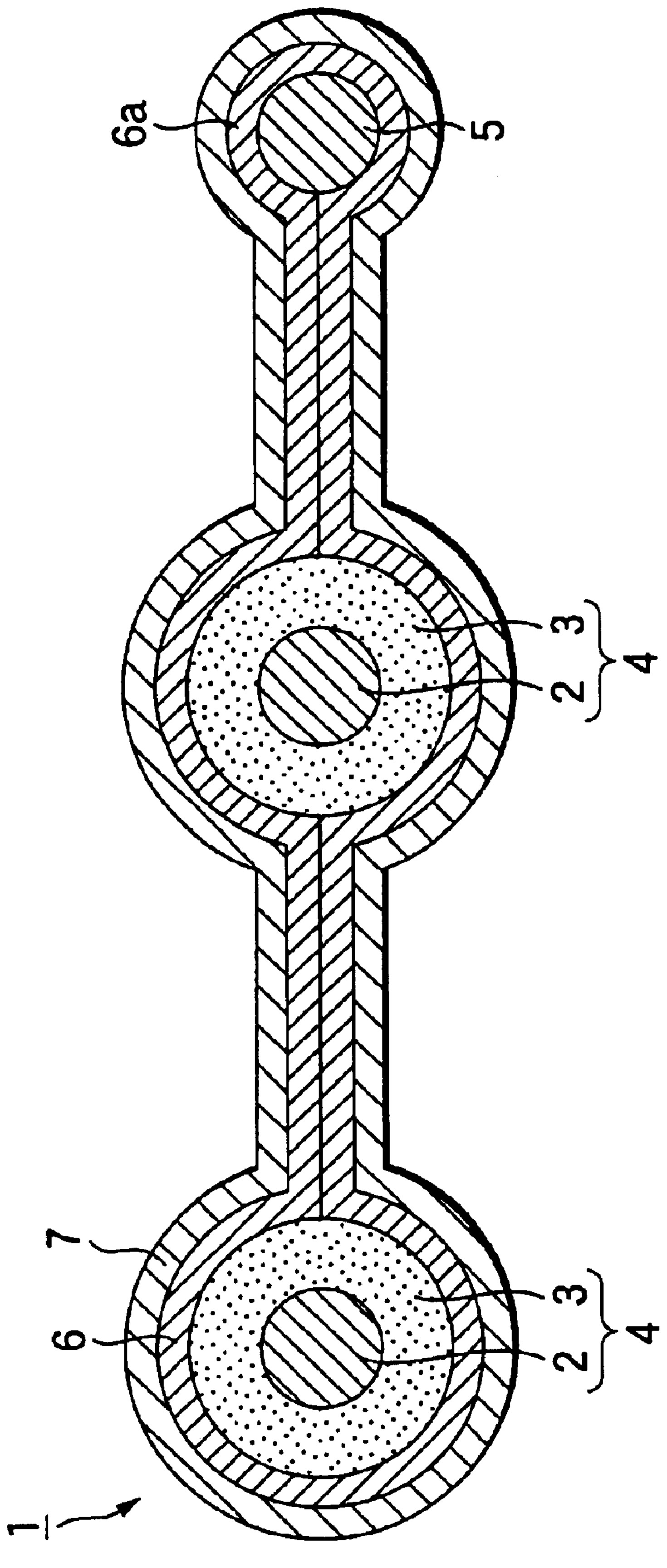
FIG. 1 is a sectional view showing a flat shielding electric wire according to a first embodiment of the present invention.

Preferred embodiments of the present invention will be described below with reference to FIGS. 1 to 6.

In the shielded structure, an aluminum foil covering member 6 of the flat shielding electric wire 1 is electrically connected to a conductive wire 13*a* of a grounding conductor 13 by an ultrasonic horn 15 by utilizing the resin members 10 and 11 and detailed description will be given below.

As shown in FIG. 1, the flat shielding electric wire 1 is constituted by two shielding cores 4, a drain wire 5, an aluminum foil covering member 6 and an insulating outer casing 7. The two shielding cores 4 have cores 2 covered with insulating inner casings 3 respectively and is arranged in parallel. The drain wire 5 is arranged in parallel in the outside position of the two shielding cores 4 in the same manner. The aluminum foil covering member 6 as a shield covering member of an electric conductor covers the outer periphery of the two shielding cores 4 and has a contact portion 6*a* for the grounding conductor, which is provided on the outside in the direction of the arrangement of the two shielding cores 4, covering the drain wire 5. The insulating outer casing 7 further covers the outer periphery of the aluminum foil covering member 6. The insulating inner casing 3 and the insulating outer casing 7 are formed of an insulator which is made of a synthetic resin, and the core 2 and the drain wire 5 are formed of an electric conductor in the same manner as the aluminum foil member 6.

Figure 2:
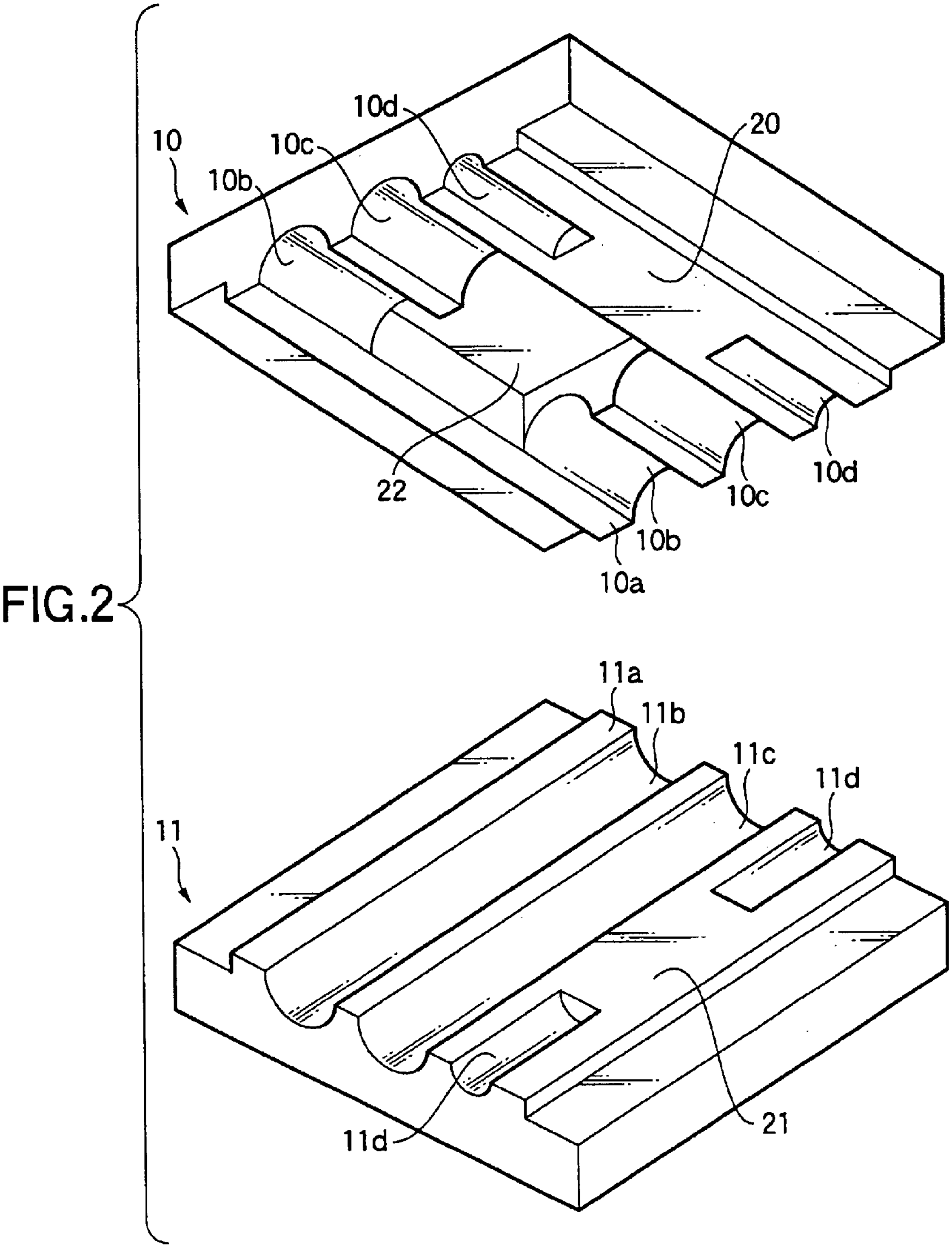
FIG. 2 is a perspective view showing a pair of resin members according to the first embodiment of the present invention.

As shown in FIG. 2, the resin members 10 and 11 are blocks having the same shape and formed of a synthetic resin respectively, and concave portions 10*b*, 10*c*, 10*d*, 11*b*, 11*c* and 11*d* almost corresponding to the outer sectional shape of the shielding core 4 portion and the drain wire 5 portion in the flat shielding electric wire 1 are formed with mutual bonding faces 10*a* and 11*a* butted against each other, respectively. The concave portions 10*b*, 10*c*, 11*b* and 11*c* are almost semicircular arc-shaped grooves having the radius of the outer shape of the shielding core 4 portion set to be a radius in detail. Moreover, the concave portions 10*d* and 11*d* are almost semicircular arc-shaped grooves having the radius of the outer shape of the drain wire 5 portion set to be a radius in detail.

Furthermore, the mutual bonding faces 10*a* and 11*a* of the resin members 10 and 11 have flat faces 20 and 21 corresponding to the contact portion 6*a* for the grounding conductor of the flat shielding electric wire 1 and the grounding conductor 13 for pressing the contact portion 6*a* for the grounding conductor and the grounding conductor 13 with the mutual bonding faces 10*a* and 11*a* butted against each other. The concave portions 10*d* and 11*d* are caused to be discontinuous by the flat faces 20 and 21, respectively.

Moreover, a grounding conductor antislip groove 22 for inserting the grounding conductor 13 is provided in an inner position in the direction of the insertion from a portion in which the contact portion 6*a* for the grounding conductor of the aluminum foil covering member 6 and the grounding conductor 13 come in contact with each other on the bonding face 10*a* of the upper resin member 10 applied on the ultrasonic excitation. The grounding conductor antislip groove 22 is set to have a depth D1 which is almost half of an outside diameter D2 of the grounding conductor 13 as shown in FIG. 3.

As the physical properties of the resin members 10 and 11, moreover, they are less fused than the insulating outer casing 7 and are made of an acryl based resin, an ABS (acrylonitrile—butadiene—styrene copolymer) based resin, a PC (polycarbonate) based resin, a PE (polyethylene) based resin, a PEI (polyetherimide) based resin or a PBT (polybutylene terephthalate) based resin and so on, and are generally harder than vinyl chloride to be used for the insulating outer casing 7. In respect of conductiveness and conductive safety, practicality is required for all the resins described above and the PEI (polyetherimide) based resin and the PBT (polybutylene terephthalate) based resin are particularly suitable if a decision is carried out including appearance and insulating properties.

Figure 3:
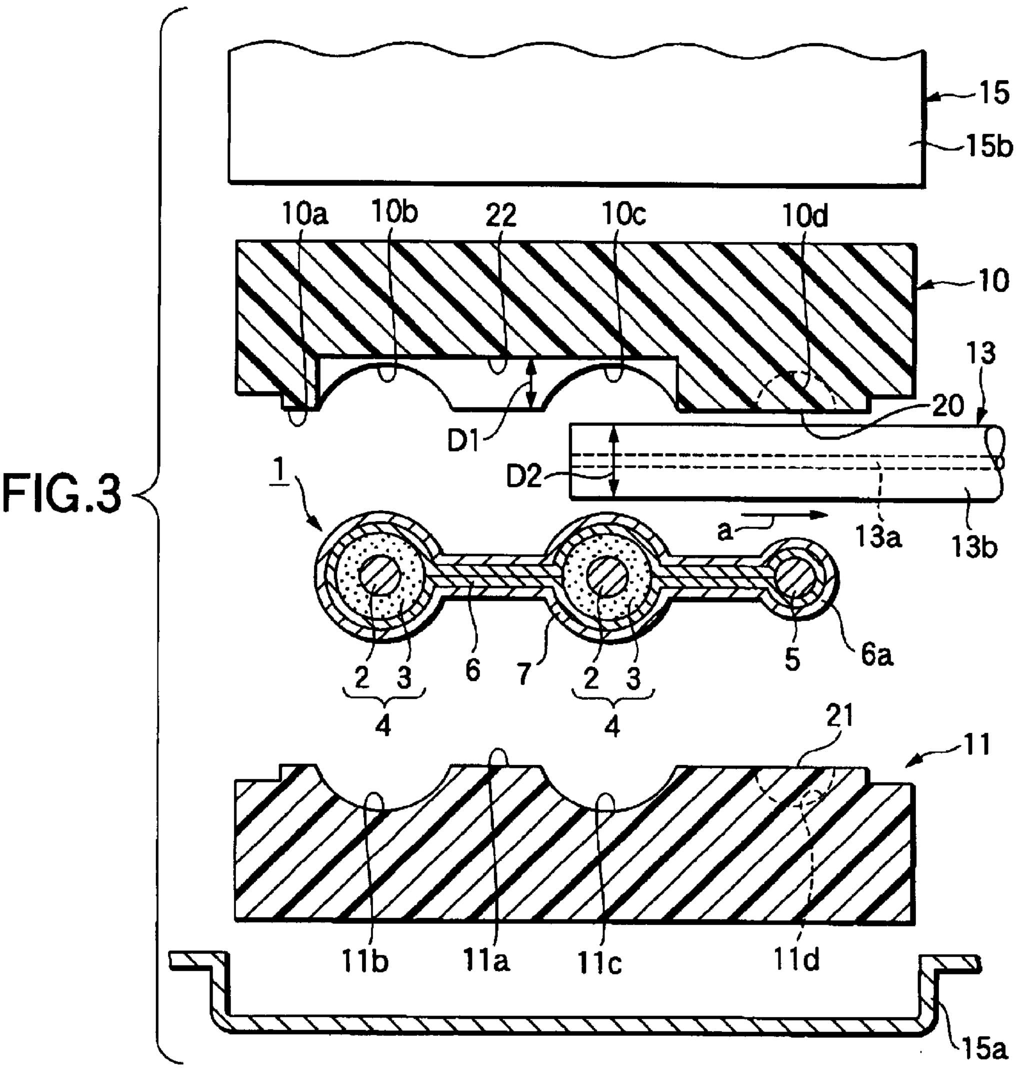
FIG. 3 is a view showing the arrangement relationship of each member of a shield structure for the application of an ultrasonic excitation according to the first embodiment of the present invention.

The grounding conductor 13 is constituted by the conductive wire 13*a* and an insulating outer casing 13*b* for covering an outer periphery thereof as shown in FIG. 3.

The ultrasonic horn 15 is constituted by a lower support base 15*a* capable of positioning the resin member 11, and an ultrasonic horn body 15*b* provided just above the lower support base 15*a* and capable of applying an ultrasonic excitation while causing pressing force downwardly as shown in FIG. 3.

Next, a shielding procedure will be described. As shown in FIG. 3, the lower resin member 11 is provided on the lower support base 15*a* of the ultrasonic horn 15, the vicinity of the end of the flat shielding electric wire 1 is mounted on the lower resin member 11. One end side of the grounding conductor 13 is mounted on the flat shielding electric wire 1. Furthermore, the upper resin member 10 is put from thereabove. Thus, the flat shielding electric wire 1 is provided in the concave portions 10*b*, 10*c*, 10*d*, 11*b*, 11*c* and 11*d* of the resin members 10 and 11, and the end side of the grounding conductor 13 is provided between the upper position of the contact portion 6*a* for the grounding conductor and drain wire 5 in the flat shielding electric wire 1 and the upper resin member 11, thereby bringing an ultrasonic set state. In the ultrasonic set state, a tip portion of the grounding conductor 13 inserted between the resin members 10 and 11 is accommodated in the grounding conductor antislip groove 22 of the upper resin member 10 and a portion of this side of the tip portion of the grounding conductor 13 is pressed by the upper an lower flat faces 20 and 21 together with the flat shielding electric wire 1.

Figure 4:
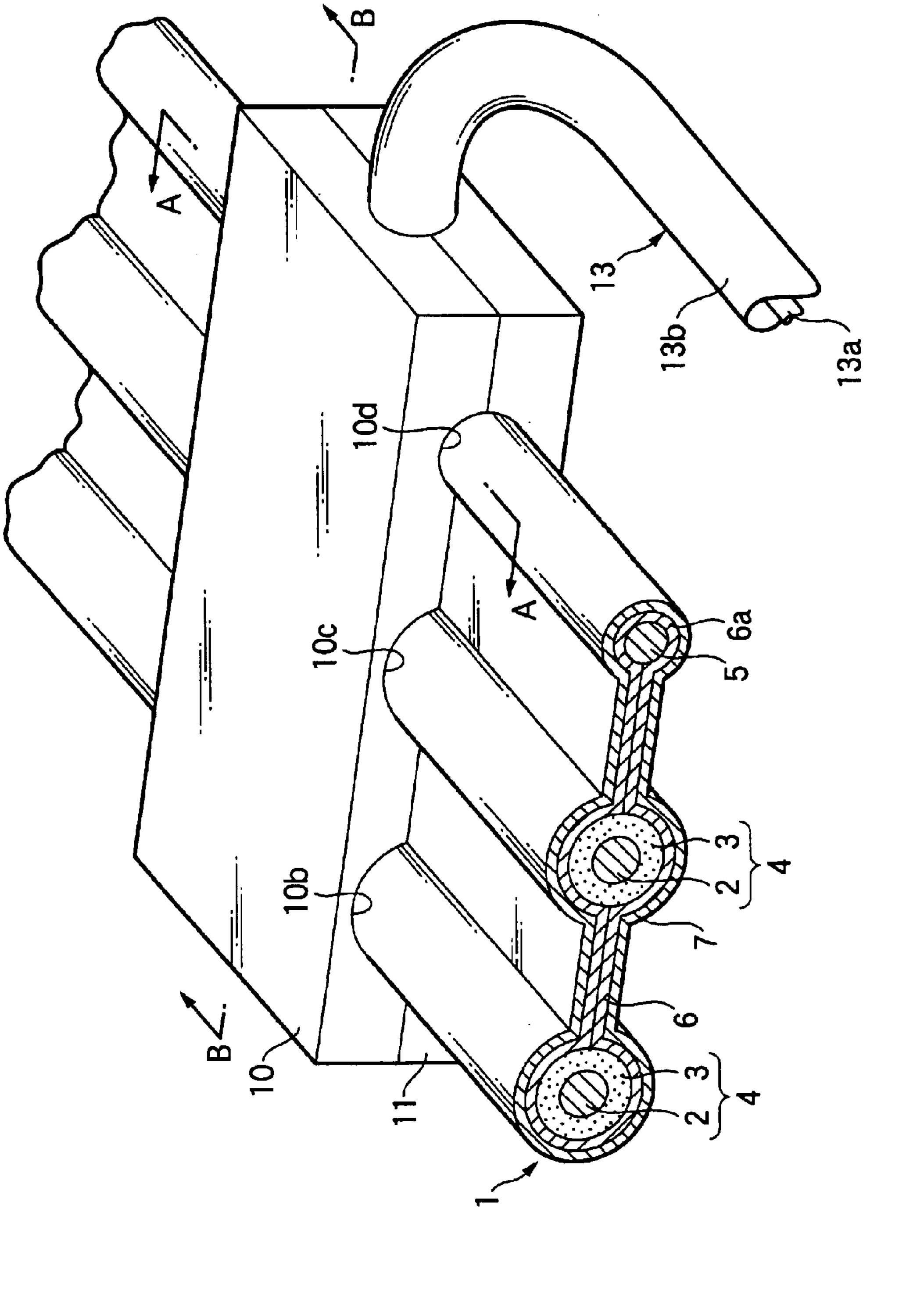
FIG. 4 is a perspective view showing the flat shielding electric wire having a shielded structure added thereto according to the first embodiment of the present invention.
Figure 5:
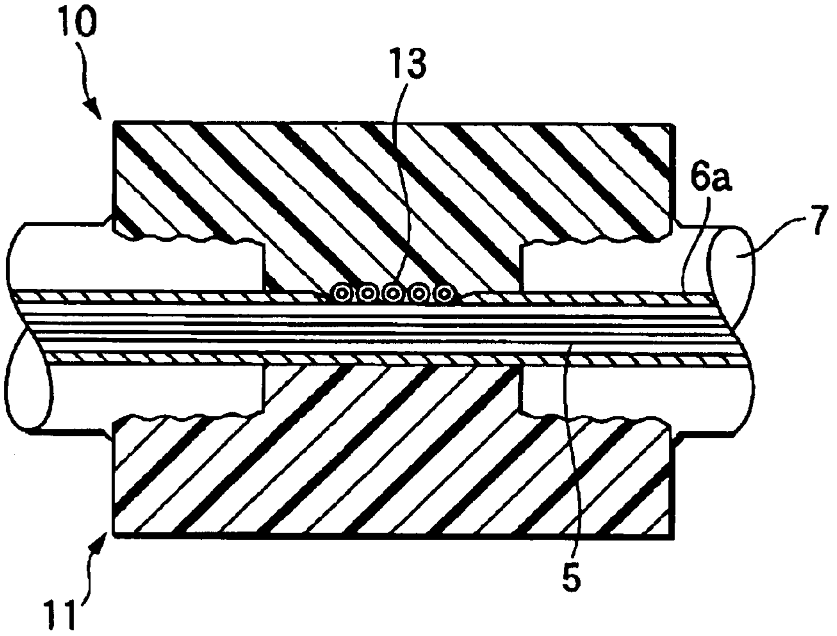
FIG. 5 is a sectional view taken along a line A—A in FIG. 4, illustrating the first embodiment of the present invention.
Figure 6:
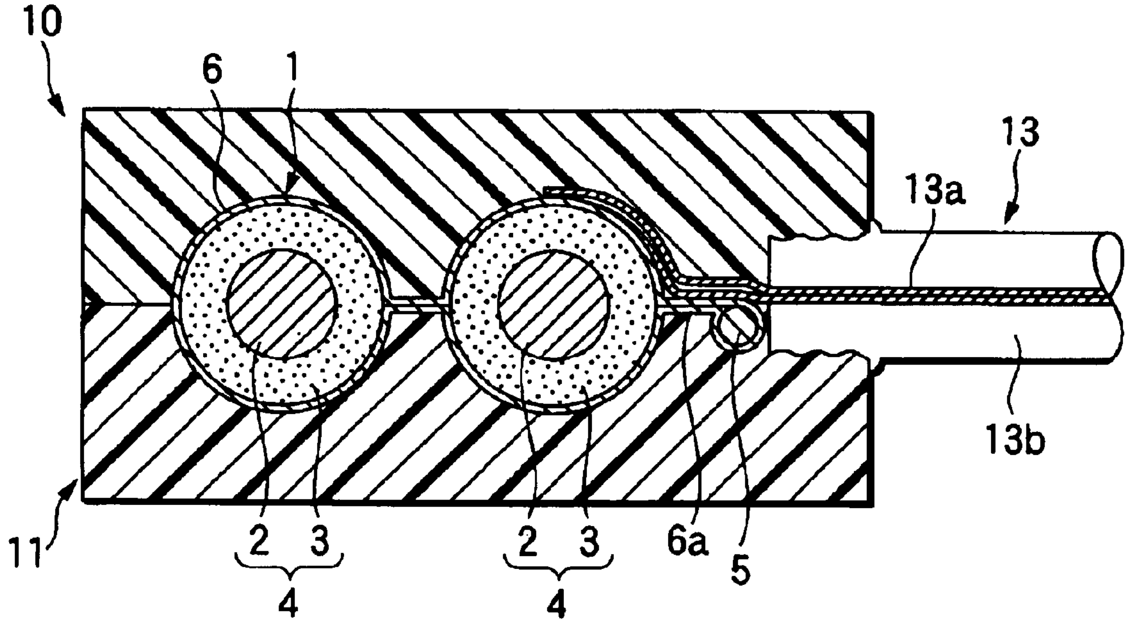
FIG. 6 is a sectional view taken along a line B—B in FIG. 4, illustrating the first embodiment of the present invention.
Figure 7:
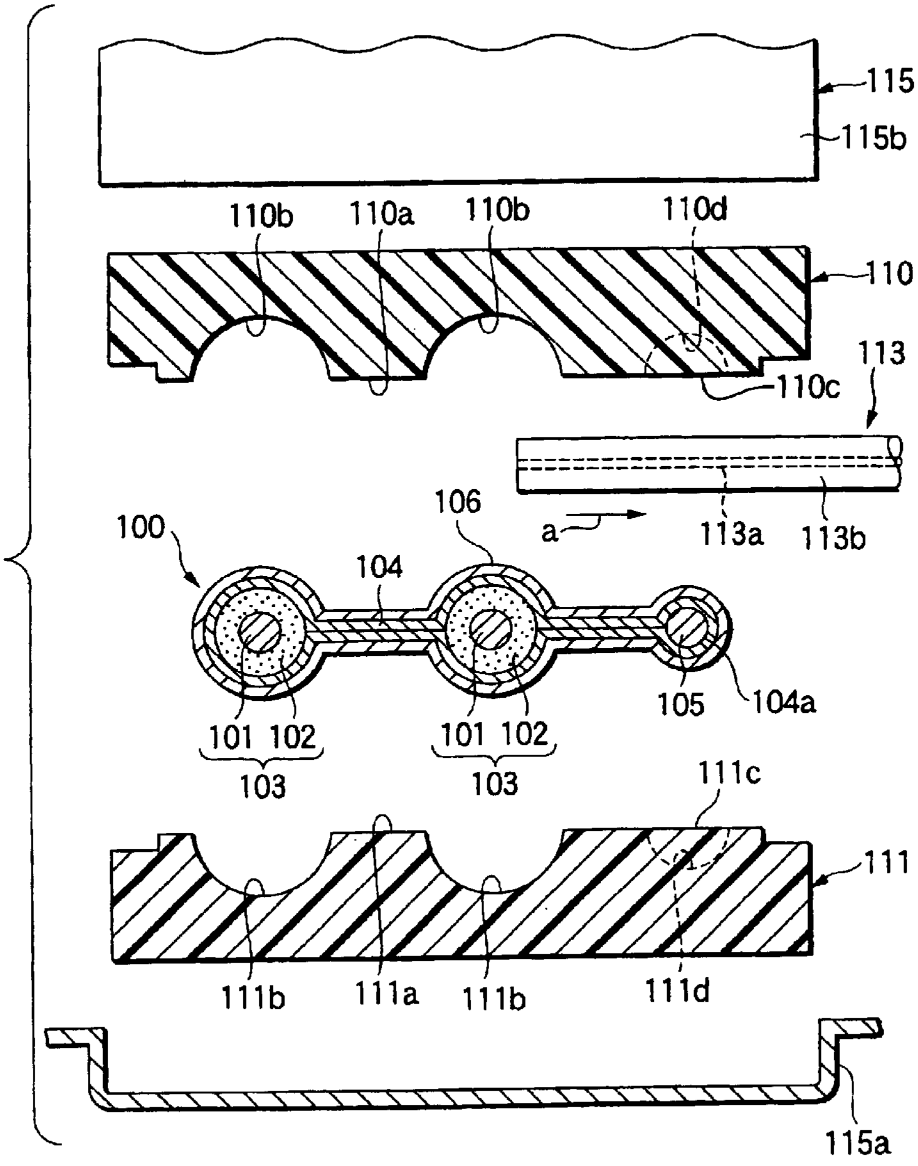
FIG.7 PRIOR ART
FIG. 7 is a view showing the arrangement relationship of each member of a related shield structure for the application of an ultrasonic excitation.

Next, the ultrasonic horn body 15*b* is brought down to give a vibration through the ultrasonic horn 15 while applying compression force between the resin members 10 and 11. Consequently, the insulating outer casing 7 of the flat shielding electric wire 1 and the insulating outer casing 13*b* of the grounding conductor 13 are fused and scattered by the internal heat generation of a vibration energy so that the conductive wire 13*a* of the grounding conductor 13, the aluminum foil covering member 6 and drain wire 5 in the flat shielding electric wire 1 come in electrical contact with each other as shown in FIGS. 5 and 6. Moreover, each of the contact portions of the bonding faces 10*a* and 11*a* of the resin members 10 and 11, the contact portion of the internal peripheral faces of the concave portions 10*b*, 10*c*, 10*d*, 11*b*, 11*c* and 11*d* of the resin members 10 and 11 and the insulating outer casing 7 of the flat shielding electric wire 1, and the contact portion of the insulating outer casing 13*b* of the grounding conductor 13 and the resin members 10 and 11 are fused by the internal heat generation of the vibration energy and the fused portions are solidified after the ultrasonic excitation is completely applied. Consequently, the resin members 10 and 11, the flat shielding electric wire 1 and the grounding conductor 13 are fixed to each other as shown in FIG. 4.

In the shielded structure of the flat shielding electric wire 1, the flat shielding electric wire 1 is provided between the resin members 10 and 11 and one end side of the grounding conductor 13 is provided between the position of the contact portion 6*a* for the grounding conductor of the flat shielding electric wire 1 and the upper resin member 10. When an ultrasonic excitation is applied between the resin members 10 and 11 thus provided, the insulating outer casings 13*b* and 7 are fused and scattered by the internal heat generation of the vibration energy so that the conductive wire 13*a* of the grounding conductor 13 is caused to come in contact with the aluminum foil covering member 6. Accordingly, it is not necessary to carry out a peeling work itself. In addition, a shielding process can be easily carried out at a simple step of sequentially assembling the lower resin member 11, the flat shielding electric wire 1, one end side of the grounding conductor 13 and the upper resin member 10 and applying an ultrasonic excitation. Thus, the number of steps is decreased and a complicated manual work is not required so that automation can also be achieved.

In the shielded structure of the flat shielding electric wire 1, moreover, when an ultrasonic wave is transmitted in such a state that a part of the grounding conductor 13 provided between the resin members 10 and 11 is accommodated in the grounding conductor antislip groove 22 of the upper resin member 10 on the ultrasonic excitation application side, the transmitted ultrasonic wave is reduced by the grounding conductor antislip groove 22. Consequently, the cleaning effect caused by the ultrasonic excitation can be reduced and the grounding conductor is rarely repelled out of the portion between the resin members 10 and 11 in the direction of an arrow a in FIG. 3. As shown in FIG. 6, accordingly, a sufficient contact can be obtained between the grounding conductor 13 and the contact portion 6*a* for the grounding conductor of the shield covering member 6 so that the reliability of an electric connection performance can be enhanced.

In the embodiment, moreover, the drain wire 5 is provided in the contact portion 6*a* for the grounding conductor of the aluminum foil covering member 6. Therefore, the conductive wire 13*a* of the grounding conductor 13 also comes in contact with the drain wire 5 so that the shielding process can be carried out reliably.

In the embodiment, furthermore, the grounding conductor antislip groove 22 has the depth D1 which is almost half of the outside diameter D2 of the grounding conductor 13. Therefore, the grounding conductor 13 portion accommodated in the grounding conductor antislip groove 22 of the upper resin member 10 on the ultrasonic excitation application side is slightly pressed over the bottom face of the grounding conductor antislip groove 22, and is not fluttered by the ultrasonic excitation, while the ultrasonic excitation can be reduced sufficiently. Therefore, the grounding conductor 13 can be ultrasonic welded reliably in a desirable set position.

In the embodiment, moreover, the resin members 10 and 11 compress the contact portion 6*a* for the grounding conductor of the aluminum foil covering member 6 and the grounding conductor 13 through the flat faces 20 and 21. When the vibration energy of the ultrasonic excitation application is given in the compression state, the insulating outer casings 13*b* and 7 are fused and scattered as shown in FIG. 5, while the conductive wire 13*a* of the grounding conductor 13 is expanded by compression force and is thereby connected to the aluminum foil covering member 6 in the expansion state. Accordingly, a large number of contacts of the grounding conductor 13 and the aluminum foil covering member 6 can be obtained and the reliability of an electric connection characteristic can be enhanced. In other words, in the case in which the flat faces 20 and 21 are provided in the resin members 10 and 11, the effect of expanding the conductive wire 13*a* of the grounding conductor 13 is obtained as described above. To the contrary, the grounding conductor 13 sufficiently receives the ultrasonic excitation. Therefore, it is apparent that the cleaning effect is apt to be produced by the ultrasonic excitation and contact failures are easily generated by repellence. In the embodiment, the repellence can be prevented by the grounding conductor antislip groove 22 as much as possible. Therefore, it is possible to simultaneously satisfy an increase in the number of contacts which is caused by the expansion of the conductive wire 13*a* of the grounding conductor 13 and a contact reliability based the prevention of the repellence, and furthermore, to enhance the reliability of the electric connection performance.

In the embodiment, moreover, if a low-melting metal plated wire such as a tin plated electric wire is used as the conductive wire 13*a* of the grounding conductor 13, the low-melting metal plated wire is partially fused and comes in contact with the aluminum foil covering member 6 by a vibration energy. Therefore, a reliability in the contact portion of the aluminum foil covering member 6 of the flat shielding electric wire 1 and the conductive wire 13*a* of the grounding conductor 13 can be enhanced.

While the insulating outer casing 13*b* is not peeled when the grounding conductor 13 is to be arranged between the resin member 10 and the flat shielding electric wire 1 in the embodiment, the insulating outer casing 13*b* may be peeled.

While the shield covering member is constituted by the aluminum foil covering member 6 in the embodiment, it may be constituted by a conductive metal foil other than aluminum or by the braided wire of an electric conductor.

While the flat shielding electric wire 1 is provided with the drain wire 5 in the embodiment, the drain wire 5 does not need to be always provided. If the drain wire 5 is provided as in the embodiment, it is possible to obtain the effect of enhancing the reliability of the contact portion by causing the conductive wire 13*a* of the grounding conductor 13 to come in contact with the drain wire 5 by the ultrasonic welding as described above, and furthermore, the shielding process can be carried out even if only the drain wire 5 is utilized. Therefore, there is an advantage that a variation in a countermeasure against the shielding can be increased correspondingly.

While the flat shielding electric wire 1 has the two shielding cores 4 in the embodiment, it is a matter of course that the present invention can be similarly applied to the flat shielding electric wire 1 having three shielding cores 4 or more.

Although the present invention has been shown and described with reference to specific preferred embodiments, various changes and modifications will be apparent to those skilled in the art from the teachings herein. Such changes and modifications as are obvious are deemed to come within the spirit scope and contemplation of the present invention as defined in the appended claims.

What is claimed is:

1. A shielded structure of a flat shielding electric wire, comprising:

a flat shielding electric wire including:

a plurality of shielding cores;

an inner insulating sheath, covering each of the plurality of shielding cores;

a conductive covering member, covering the inner insulating sheaths; and a first outer insulating sheath, covering the conductive covering member;

a pair of resin members, sandwiching the flat shielding electric wire there between; and a coating electric wire, which is provided between the flat shielding electric wire and one of the pair of resin members, including:

a conductive wire; and a second outer insulating sheath, covering the conductive wire, wherein the first outer insulating sheath and the second outer insulating sheath are fused by ultrasonic excitation so that the conductive wire is electrically connected to a part of the conductive covering member; and wherein at least one of the pair of resin members is formed with an ultrasonic attenuation groove disposed so as to face the first and second outer insulating sheaths, as well as to face the conductive covering member and the conductive wire of the coating electric wire.

2. The shielded structure as set forth in claim 1, wherein the ultrasonic attenuation groove faces a tip end portion of the second outer insulating sheath.

3. The shielded structure as set forth in claim 1, further comprising a drain wire covered by said part of the conductive covering member.

4. A The shielded structure as set forth in claim 1, wherein the conductive wire is a plated wire having a lower melting point than a temperature attained by the ultrasonic excitation.

5. The shielded structure as set forth in claim 1, wherein the ultrasonic attenuation groove is formed on a portion of the at least one of pair of resin members, corresponding to a portion in which the flat shielding electric wire and the coating electric wire are overlapped.

6. A shielded structure of a flat shielding electric wire comprising:

a flat shielding electric wire including:

a plurality of shielding cores;

an inner insulating sheath, covering each of the plurality of shielding cores;

a conductive covering member, covering the inner insulating sheaths; and a first outer insulating sheath, covering the conductive covering, member;

a pair of resin members, sandwiching the flat shielding electric wire there between; and a coating electric wire, which is provided between the flat shielding electric wire and one of the pair of resin members, including:

a conductive wire; and a second outer insulating sheath, covering the conductive wire, wherein the first outer insulating sheath and the second outer insulating sheath are fused by ultrasonic excitation so that the conductive wire is electrically connected to a part of the conductive covering member; and wherein at least one of the pair of resin members is formed with an ultrasonic attenuation groove so as to face at least a part of the second outer insulating sheaths, wherein a depth of the ultrasonic attenuation groove is a half of an outer diameter of the second outer insulating sheath.

7. A shielded structure of a flat shielding electric wire comprising:

a flat shielding electric wire including:

a plurality of shielding cores;

an inner insulating sheath, covering each of the plurality of shielding cores;

a conductive covering member, covering the inner insulating sheaths; and a first outer insulating sheath, covering the conductive covering member;

a pair of resin members, sandwiching the flat shielding electric wire there between; and a coating electric wire, which is provided between the flat shielding electric wire and one of the pair of resin members, including:

a conductive wire; and a second outer insulating sheath, covering the conductive wire, wherein the first outer insulating sheath and the second outer insulating sheath are fused by ultrasonic excitation so that the conductive wire is electrically connected to a part of the conductive covering member; and wherein at least one of the pair of resin members is formed with an ultrasonic attenuation groove so as to face at least a part of the second outer insulating sheaths, wherein each bonding face of the pair of resin members is formed with a first region fitting with an outer shape of the flat shielding electric wire and a second region having a flat face to press the conductive wire and the conductive covering member.

8. A method of manufacturing a flat shielding electric wire, comprising the steps of:

providing a flat shielding electric wire, which includes a plurality of shielding cores, an inner insulating sheath covering each of the plurality of shielding cores, a conductive, covering member covering the inner insulating sheaths, and a first outer insulating sheath covering the conductive covering member;

providing a coating electric wire, which includes a conductive wire and a second outer insulating sheath covering the conductive wire;

providing a pair of resin members, having bonding faces, at least one of said bonding faces formed with an ultrasonic attenuation groove;

sandwiching the flat shielding electric wire and the coating electric wire by the pair of resin members so that the ultrasonic attenuation groove faces the first and second outer insulating sheaths; and applying an ultrasonic wave to the first outer insulating sheath and the second outer insulating sheath such that the first outer insulating sheath and the second outer insulating sheath are fused by ultrasonic excitation so that the conductive wire is electrically connected to a part of the conductive covering member.

9. The method of manufacturing a flat shielding electric wire as set forth in claim 8, wherein said step of providing a pair of resin members comprises providing a pair of resin members wherein the ultrasonic attenuation groove is formed on a portion, of the at least one resin member, corresponding to a portion in which the flat shielding electric wire and the coating electric wire are overlapped.

* * * * *